United States Patent [19]
Ellis et al.

[11] Patent Number: 6,029,226
[45] Date of Patent: Feb. 22, 2000

[54] METHOD AND APPARATUS HAVING AUTOMATED WRITE DATA TRANSFER WITH OPTIONAL SKIP BY PROCESSING TWO WRITE COMMANDS AS A SINGLE WRITE COMMAND

[75] Inventors: Jackson L. Ellis; Richard M. Born; Matthew C. Muresan; Graeme M. Weston-Lewis, all of Fort Collins, Colo.

[73] Assignee: LSI Logic Corporation, Milpitas, Calif.

[21] Appl. No.: 08/724,522

[22] Filed: Sep. 30, 1996

[51] Int. Cl.$^7$ .............................. G06F 13/00; G06F 9/38
[52] U.S. Cl. .......................... 711/100; 711/112; 711/169; 710/6; 710/24
[58] Field of Search ...................... 711/112, 113, 711/114, 157, 169, 100, 167, 4; 395/825, 826, 844; 710/5, 6, 24

[56] References Cited

U.S. PATENT DOCUMENTS

| | | | |
|---|---|---|---|
| 4,217,640 | 8/1980 | Porter et al. | 395/183.1 |
| 4,225,922 | 9/1980 | Porter | 711/123 |
| 4,371,927 | 2/1983 | Wilhite et al. | 711/137 |
| 4,833,535 | 5/1989 | Ozeki et al. | 348/400 |
| 5,249,279 | 9/1993 | Schmenk et al. | 395/825 |
| 5,283,883 | 2/1994 | Mishler | 395/853 |
| 5,301,287 | 4/1994 | Herrell et al. | 711/202 |
| 5,448,709 | 9/1995 | Chandler et al. | 395/872 |
| 5,450,609 | 9/1995 | Schultz et al. | 711/114 |
| 5,469,548 | 11/1995 | Callison et al. | 711/114 |
| 5,471,639 | 11/1995 | Harrington | 395/842 |
| 5,499,355 | 3/1996 | Krishnamohan et al. | 711/137 |
| 5,504,868 | 4/1996 | Krakirian | 395/825 |
| 5,513,374 | 4/1996 | Baji | 395/846 |
| 5,537,552 | 7/1996 | Ogasawara et al. | 395/877 |
| 5,551,002 | 8/1996 | Rosich et al. | 711/134 |
| 5,566,317 | 10/1996 | Treiber et al. | 711/117 |
| 5,586,291 | 12/1996 | Kasker et al. | 711/113 |
| 5,586,294 | 12/1996 | Goodwin et al. | 711/137 |
| 5,603,002 | 2/1997 | Hashimoto | 711/113 |
| 5,640,593 | 6/1997 | Krakirian . | |
| 5,778,436 | 7/1998 | Kedem et al. | 711/137 |
| 5,802,566 | 9/1998 | Hagersten | 711/137 |
| 5,809,534 | 9/1998 | Elkhoury . | |
| 5,829,042 | 10/1998 | Leung | 711/147 |
| 5,835,947 | 11/1999 | Cherabuddi | 711/125 |
| 5,890,212 | 3/1999 | Sokolov et al. | 711/113 |

OTHER PUBLICATIONS

Japanese Abstract of Japanese Patent Publication 6–75710, published Mar. 18, 1994.

*Primary Examiner*—Glenn Gossage

[57] ABSTRACT

A method and apparatus for writing data to a storage device such as a hard disk drive in which two write commands from an initiator are processed as a single command at the storage device. A first request is received from a small computer systems interface (SCSI) bus to write a first set of data to a storage device. The first set of data is transferred to memory for temporary storage prior to transfer to the storage device. Thereafter, a second write request is received to write a second set of data to the storage device in which the write request includes a logical block address. An ending logical block address determined after transferring the first set of data is compared to the logical block address of the second request to determine whether the second set of data can be written to the storage device along with the first set of data as a single write operation based on the comparison of the logical block address of the second request and the ending logical block address. In response to a determination that the first set of data and the second set of data can be written to the disk as a single write operation, the second set of data is written to the memory as a part of the first write request. The second set of data may be automatically transferred to the memory, to be written to the storage device as a second write operation in response to a determination that the first set of data and the second set of data cannot be written as a single write operation.

8 Claims, 5 Drawing Sheets

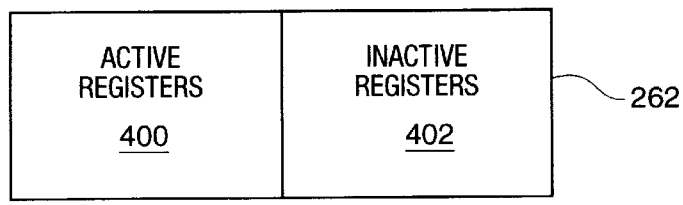

| BYTE3 | BYTE2 | BYTE1 | BYTE0 | DESCRIPTION |
|---|---|---|---|---|
| | D_HSBA | | | Host Segment Base Pointer |
| | D_HSCA | | | Host Segment Ceiling Pointer |
| | D_HAP | | | Host Address Pointer |
| D_HXFER | | D_HBSC | | Host Transfer Counter / Host buffer Space Counter |
| Mode | Cfg | SSC | | DMA Mode / DMA Config / Sector Size Counter |
| | D_LSC | | | Logical Sector Counter |
| Tag | Status | Debug | | Command Tag / DMA Status / DMA Debug |
| | ContextVRC | | | VRC Protection accumulator value over context frame |

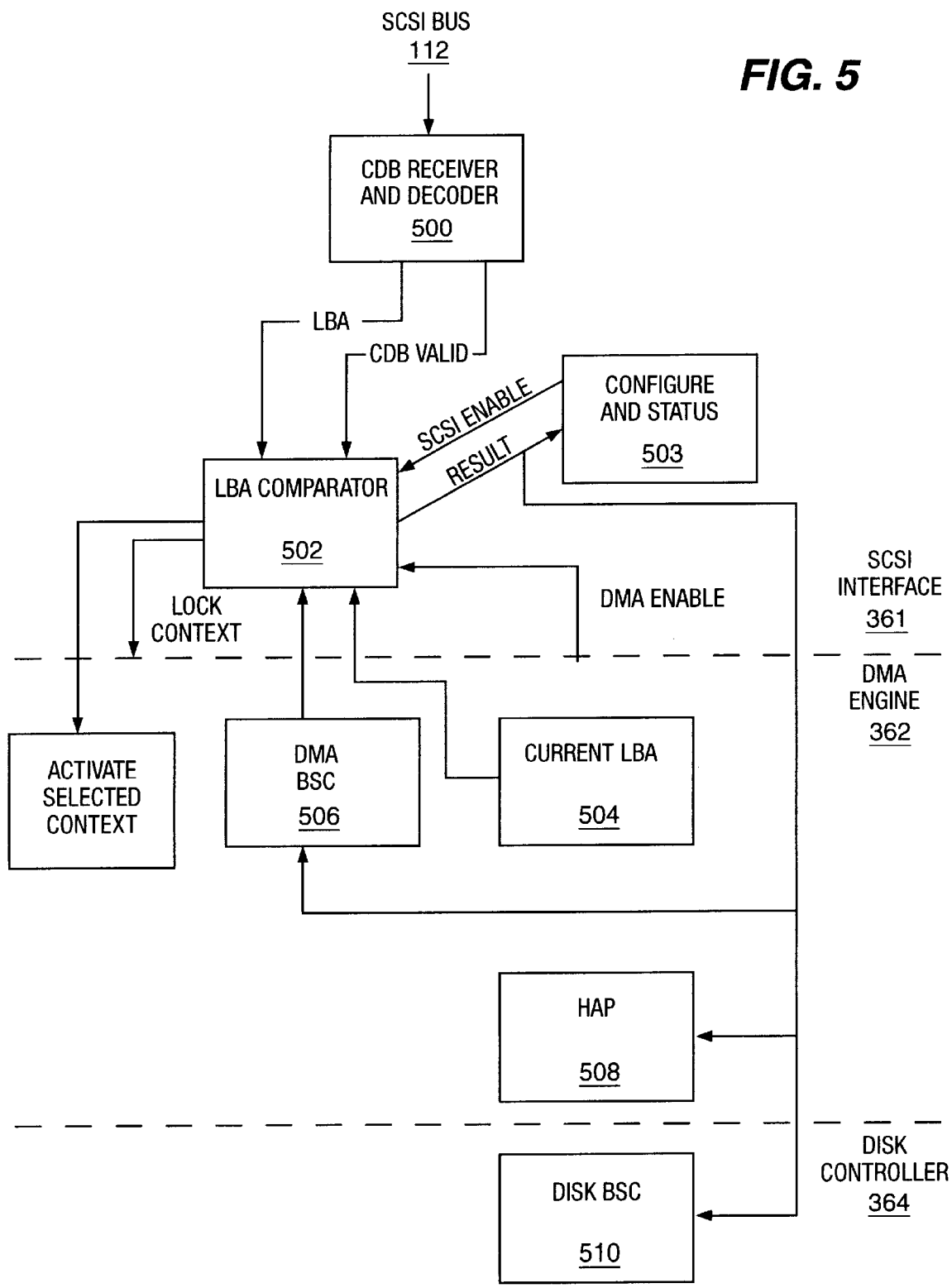

METHOD AND APPARATUS HAVING AUTOMATED WRITE DATA TRANSFER WITH OPTIONAL SKIP BY PROCESSING TWO WRITE COMMANDS AS A SINGLE WRITE COMMAND

BACKGROUND OF THE INVENTION

1. Technical Field

The present invention relates generally to an improved data processing system and in particular to an improved method and apparatus for accessing data in a storage device. Still more particularly, the present invention relates to an improved method and apparatus for writing data to a storage device.

2. Description of the Related Art

Personal computers are becoming even more powerful, reaching levels where they are displacing minicomputers and even mainframe computers. In the process of downsizing, however, connectivity between and/or among personal computers and peripheral devices has evolved as a critical issue. Thus it has become increasingly important to be able to share peripheral devices such as hard drives, printers, scanners, or compact disc read only memory (CD-ROM) changers between multiple personal computers, or to be able to attach several peripherals to a single personal computer.

One means for achieving such connectivity is through the use of the small computer system interface ("SCSI" or commonly called the "SCSI bus"), which is a popular device independent parallel bus. The SCSI bus can, for example, be used to connect multiple devices including hard disk drives, printers and other input/output peripheral devices to a host computer.

Various versions of the SCSI standard have been proposed, approved, and/or adopted, including SCSI-1, SCSI-2, and SCSI-3. As used herein, the acronym "SCSI" is used to refer to any of these standards, although the SCSI-3 standard has been selected as exemplary for the purposes of describing the invention. Specifications for these standards may be obtained from the American National Standards Institute, New York, N.Y., as document numbers X3.131-1986 (SCSI-1), X3.131-1994 (SCSI-2), and X3.253-1995 (approved SCSI-3), which are incorporated by reference.

The SCSI standard provides specifications for mechanical, electrical, and functional characteristics of the bus, including definitions of the physical characteristics of the bus conductors, the electrical characteristics of the signals that the conductors carry, and the meanings of those signals (e.g., control or data).

Devices interconnected by a SCSI bus are daisy-chained together using a common 50-conductor cable. The cable comprises nine data conductors (eight for data and one for parity), nine control conductors, and other power and ground conductors. Optionally, a 68-conductor cable may be used to allow wider information transfers (data only) of 16 bits. Typically each conductor is resistively coupled to a voltage of an inactive state. To "assert" a signal onto a conductor, a device must drive the conductor to a voltage of an active state against the resistive coupling of the conductor. If not driven, a conductor will return to its inactive state.

Communication over the SCSI bus is allowed between only two devices at any given time, although up to sixteen devices may be interconnected by the same bus. When two devices communicate on the bus, one acts as an "initiator" and the other acts as a "target." Initiator devices cause target devices on the bus to perform commands whereas target devices perform commands for the initiators. There can be multiple initiators and multiple targets on a SCSI bus. The initiator originates an operation (i.e., requests an input/output (I/O) process to be performed) and the target performs the operation. Transfers on a SCSI bus are typically synchronous (although an asynchronous option is defined) and follow a "handshaking" protocol involving the exchange of a "Request" signal from a target and an "Acknowledge" signal from an initiator. This exchange takes place on conductors of the bus that are specifically dedicated to the handshaking task, and is performed in connection with each individual information transfer operation on the SCSI bus.

At a higher logical level, the SCSI standard defines a protocol for managing data transfers on the bus. The protocol comprises various phases, beginning with the SCSI bus in a "bus free phase" in which the SCSI bus is idle. To initiate a data transfer process, the initiator causes the bus to enter an "arbitration bus phase." During the arbitration bus phase, each initiator arbitrates for the bus with the other initiators by asserting the appropriate SCSI bus conductor corresponding with a SCSI identifier (SCSI ID) unique to that specific initiator. Because each SCSI ID has an assigned priority, the initiator with the highest priority will win control of the bus. After winning control of the bus through arbitration, the initiator with the highest priority selects the target device of interest in a "selection bus phase." The initiator controlling the bus asserts its SCSI ID as well as the SCSI ID of the target onto the conductors of the SCSI bus. The target detects its SCSI ID on the bus conductors and responds. In a subsequent "command bus phase," the target requests a SCSI command from the initiator in control of the bus.

At still a higher logical level, the SCSI standard defines a command and status structure. Commands are used by an initiator to request a target to perform particular operations. Each SCSI command, called a SCSI command descriptor block (CDB), consists of multiple bytes, either six, ten, twelve, or sixteen bytes. Each CDB contains a series of information, which describes various addresses, control bits, and functional bits used to perform various operations. For example, a CDB contains a SCSI operation code indicating the type of operation to be performed, such as the number of blocks transferred upon execution of the command. If the command is a write command, the CDB also includes a logical block address of the first block to be transferred as well as the number of blocks to be transferred during the execution of the write command. At the completion of a command, or if for some reason a command cannot be completed by the target, the target sends a status byte to the initiator to inform the initiator of its condition.

The specifications of the SCSI standard thus combine to define an interface having multiple protocol levels. The defined interface provides computer systems with device independence within a class of devices. For example, a variety of mass storage devices (such as disk drives, tape drives, optical drives, and memory caches), printers, microprocessors, and other devices may be added to a computer system without requiring modifications to system hardware or software. In addition, special features and functions of individual devices can be handled through the use of device-dependent fields and codes in the command structure.

This performance requirement has lead to great advances in both disk drives themselves and the architecture of the disk subsystem. Disk storage sizes have increased, access times have decreased and data transfer rates have increased.

However, as more downsizing occurs and larger numbers of workstations are connected to the local area network (LAN), there is still continual pressure on improving disk subsystem performance.

In writing data to a storage device, presently available disk controller interfaces typically automatically receive a command descriptor block (CDB) and provide an interrupt to the firmware to intervene and decode the CDB. Thereafter, the firmware sets up the local direct memory access (DMA) and buffer segmentation contacts to perform a write transfer. This firmware overhead is directly included in the command response time for the storage device and can prevent the buffer from being ready in time to prevent the disk from taking an extra revolution before writing the data to the disk.

In view of the continual pressure on improving disk performance, it would be advantageous to have an improved method and apparatus for writing data to a storage device.

SUMMARY OF THE INVENTION

The present invention provides a method and apparatus for writing data to a storage device in which two write commands from an initiator are processed as a single command at the storage device. A first request is received to write a first set of data to a storage device. The first set of data is transferred to memory for temporary storage prior to transfer to the storage device. Thereafter, a second write request is received to write a second set of data to the storage device in which the write request includes a logical block address. An ending logical block address determined after transferring the first set of data is compared to the logical block address of the second request to determine whether the second set of data can be written to the storage device along with the first set of data as a single write operation based on the comparison of the logical block address of the second request and the ending logical block address. In response to a determination that the first set of data and the second set of data can be written to the disk as a single write operation, the second set of data is written to the memory as a part of the first write request. Non-contiguous data between the first request and the second request may be written to the storage device using this method. The second set of data is automatically written to to the memory for transfer to the storage device in a second write without requiring instructions from firmware, such as a microprocessor.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of active context registers included in a DMA engine and inactive context registers according to the present invention.

FIG. 5 depicts a block diagram of selected components from SCSI interface 261 and DMA engine 262 according to the present invention.

DETAILED DESCRIPTION

Figure 1:
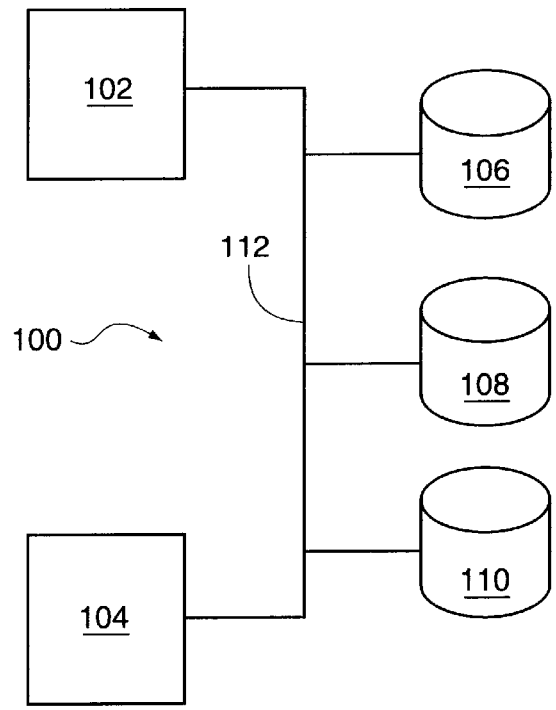
FIG. 1 depicts a data processing system 100 according to the present invention.

With reference now to the figures, and in particular with reference to FIG. 1, a data processing system 100 is depicted according to the present invention. Data processing system 100 includes computer systems 102 and 104 connected to subsystems 106, 108, and 110. These subsystems are disk drive subsystems in the depicted example. Computer systems 102 and 104 are connected to subsystems 106, 108, and 110 by bus 112. According to the present invention, bus 112 may be implemented using a number of different bus architectures, such as a small computer system interface (SCSI) bus.

Figure 2:
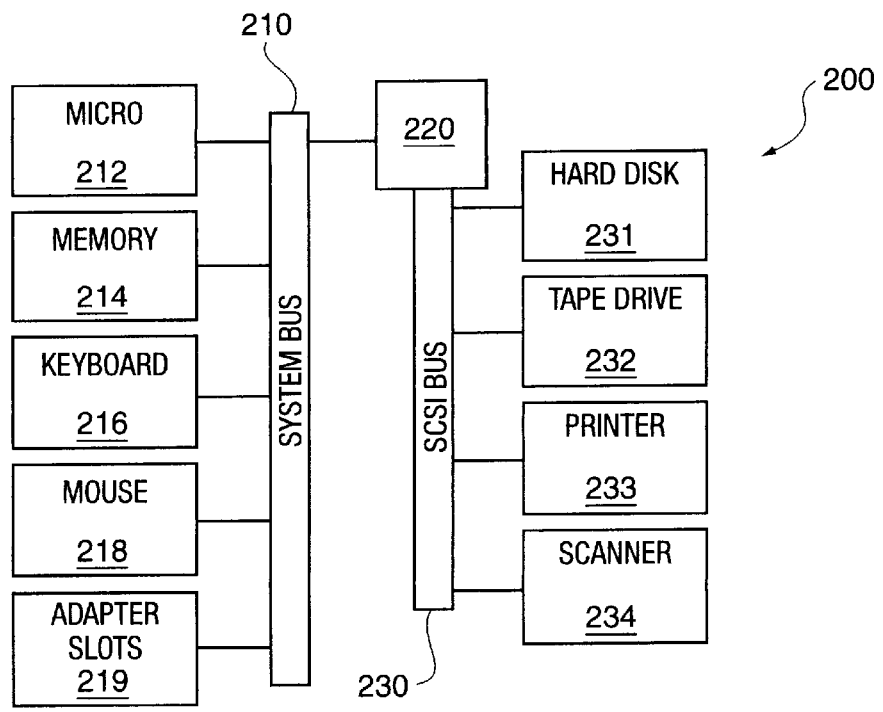
FIG. 2 is a block diagram of a computer system 200.

Referring to FIG. 2, an alternative embodiment of a data processing system in which a preferred embodiment of the present invention may be implemented is illustrated. Data processing system 200 includes a system bus 210 connecting microprocessor 212, memory 214, keyboard 216, a pointing device such as mouse 218, adapter slots 219, and other system components not shown. Adapter slots 219 may optionally be used to connect data processing system 200 to an external SCSI bus linking multiple computer systems and/or peripherals as depicted in FIG. 1.

Referring back to FIG. 2, also connected to system bus 210 through SCSI adapter 220 is SCSI bus 230. SCSI bus 230 may, in turn, be removably connected to up to seven additional peripherals such as hard disk 231, backup tape drive 232, printer 233, scanner 234, and other input/output peripheral devices. Those skilled in the art will recognize that any number of configurations of data processing systems which utilize a SCSI bus are possible.

Figure 3:
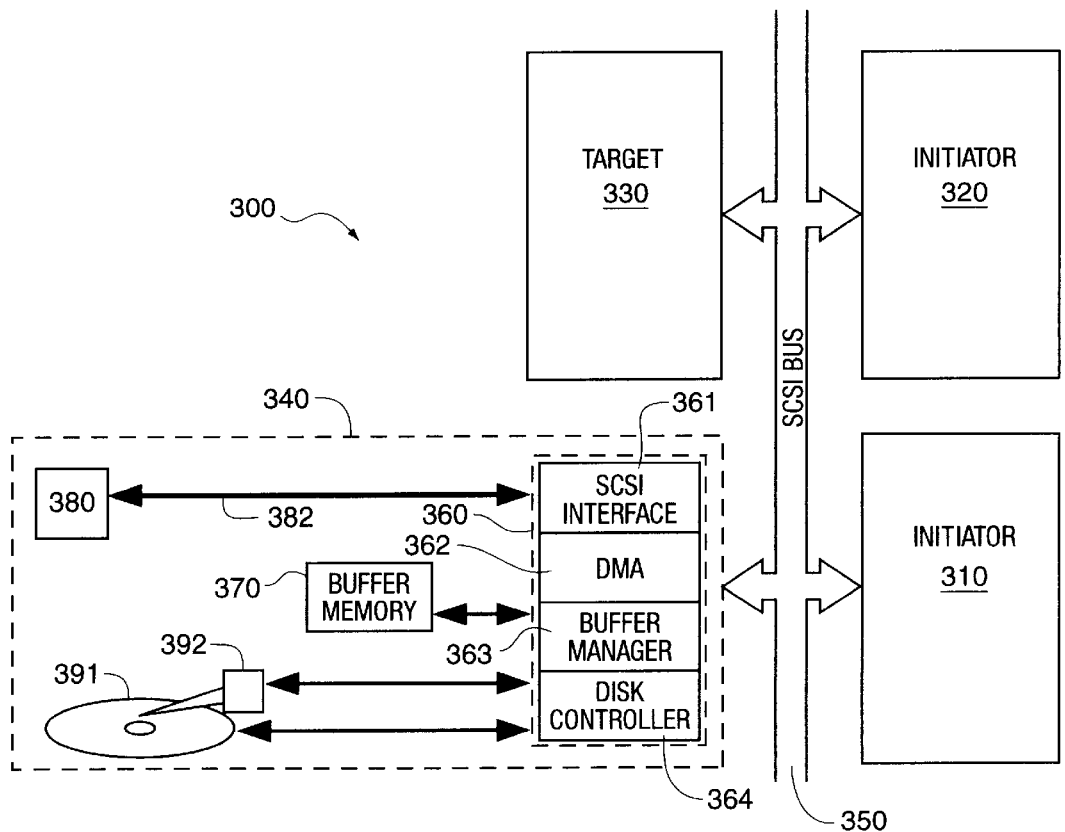
FIG. 3 depicts a simplified block diagram of SCSI bus configuration in accordance with a preferred embodiment of the present invention.

Referring to FIG. 3, a simplified block diagram of a SCSI bus configuration is illustrated in accordance with a preferred embodiment of the present invention. The SCSI bus configuration 300 includes both initiator devices 310 and 320 as well as target devices 330 and 340 coupled to a SCSI bus 350. In the depicted example, target device 340 is a hard disk computer peripheral device including a controller 360, a buffer memory 370, a microprocessor 380, a hard disk 391, and a hard disk servo 392. Controller 360 includes functional blocks such as SCSI interface portion 361, DMA engine 362, buffer manager 363, and disk controller 364 in accordance with a preferred embodiment of the present invention. These functional blocks, as well as others not shown, may be implemented in a number of different ways depending on the particular application. Controller 360 includes interfaces to buffer memory 370, microprocessor 380, a read/write interface to hard disk 391, and hard disk servo 392. Microprocessor interface 382 is connected to and controls the functional blocks depicted as SCSI interface 361, DMA engine 362, buffer manager 363, and disk controller 364.

In accordance with a preferred embodiment of the present invention, controller 360 is implemented as an application specific integrated circuit (ASIC). SCSI interface 361 in controller 360 operates as a target when selected by an initiator on the SCSI bus. As a target, SCSI interface 361 controls all phase transitions, disconnects, and reconnects for processing a command.

DMA engine 362 is configured to handle concurrent data transfers using a segmented buffer space in buffer memory

370. Each data transfer can complete a data transfer, manage multiple disconnects/reconnect sequences, and send status without requiring intervention or interaction from microprocessor 380 during the data transfer. DMA engine 362 accomplishes this by receiving programming for each concurrent data transfer in a separate "context". Each context contains all the counters and configuration information for a particular transfer.

In accordance with a preferred embodiment of the present invention, DMA engine 362 includes active context registers 400 and inactive context registers 402 as illustrated in FIG. 4. Information in context frame 404 is stored in active context registers 400 and inactive context registers 402. The active context is the context currently used for transferring data while the inactive context provides a mechanism for quick context swaps between active and inactive contexts. Inactive context registers 402 may be accessed by both hardware within controller 360 and microprocessor 380 while active context registers 400 may be accessed only by hardware within controller 360.

Additionally, each context has storage assigned to it in buffer 370 where context information is stored as a context frame when not in DMA engine 362 in controller 360.

Referring back to FIG. 4, each context frame 404 contains a host segment base pointer, a host segment ceiling pointer, and a host address pointer (HAP). The host segment base pointer and the host segment ceiling pointer point to the beginning and end of the buffer segment. When the host address pointer increments to the host segment ceiling pointer, the host address pointer moves back to the host segment base pointer.

The host address pointer is used to point to buffer addresses as they are accessed. The host transfer counter is a counter that is initialized with the number of sectors to be transferred across the DMA interface for given disk read or disk write command. The host buffer space counter is loaded with the number of sectors available in the buffer segment for disk read operations or the number of sectors available in the buffer segment for disk write operations. The counter is decremented each time data is accessed. The DMA mode includes various information about the DMA, such as when the DMA can begin a process. Other information such as whether a read or write is to occur is found in this section. DMA configuration information also is found in the context frame information such as whether CRC checking and interrupts are set in this section. The sector size counter is used to send data on byte based transfers. The logical sector counter is loaded with the logical sector address of the first sector to be transferred. The command tag register is initialized by microprocessor 380 with the value of the tag field in the SCSI command. This tag is signed by the initiator and is unique among all tags currently active from that initiator on this target. The DMA status field is employed to set alerts or initiate the sending of messages upon various actions, such as the pausing of a data access due to availability of the data or to indicate that a transfer has been finished or aborted. The DMA debug field contains information for debugging purposes, such as the amount of data to transfer after the detection of a CRC or parity error. The context VRC field is checked while a context is loaded from the buffer.

Buffer manager 363 (FIG. 3) manages the transfer of data between buffer memory 370 and DMA engine 362. Additionally, buffer manager 363 manages the transfer of data between buffer memory 370 and disk controller 364. Disk controller 364 provides for the reading and writing of data in buffer memory 370 to and from hard disk 391. Disk controller 364 will identify the physical addresses required to write data from logical block addresses (LBAs).

The presently claimed invention operates in one of two modes, automatically choosing the mode that best optimizes overall drive performance. In writing data to a storage device under the first mode, a normal write, the disk controller interface automatically receives a command descriptor block (CDB) and provides an interrupt to the firmware to intervene and decode the CDB. Thereafter, the firmware sets up the local direct memory access (DMA) and buffer segmentation contacts to perform a write transfer. This firmware overhead is directly included in the command response time for the storage device and can prevent the buffer from not being ready in time to prevent the disk from taking an extra revolution before writing the data to the disk.

Under a second mode of operation, a coalesced write, the disk controller receives a write CDB and automatically sets up the DMA engine to begin transfer of the write data to the current DMA segmentation only if the logical block address (LBA) matches a range of LBAs after the current DMA LBA. Setting up the DMA to transfer the write data to the current DMA segmentation results in a "coalesced" write, which is a merger of two host commands into a single disk command. In other words, two write commands can be performed as a single disk command. Under this mode, the automatic coalesced write is capable of skips. If a coalesced write is not feasible, the process then performs an autowrite in which pre-selected context information stored in the inactive context registers or in some other storage device, such as a buffer memory, is automatically moved into the active context registers to initiate a write without requiring instructions from firmware, such as a microprocessor.

With reference now to FIG. 5, a block diagram of selected components from SCSI interface 361 and DMA engine 362 are illustrated according to the present invention. SCSI interface 361 includes CDB receiver and decoder 500, which receives CDBs from SCSI bus 112 (FIG. 1). SCSI protocol engine 502 in SCSI interface 261 controls the reception and decoding of CDBs by CDB receiver and decoder 500. Configuration and status block 504 uses a SCSI enable signal to enable comparisons performed by LBA comparator 506. This is a status signal that is used to enable or disable this automatic comparison function performed by LBA comparator 506. LBA comparator 506 also may be enabled or disabled by a signal DMA enable from DMA engine 362.

The LBA from the received CDB is sent to LBA comparator 506, which compares the LBA from the received CDB to the current LBA in current LBA register 508 in DMA engine 362. LBA comparator 506 performs the comparison if the CDB was a valid command. LBA comparator 506 is enabled with a CDB valid signal. The current LBA from current LBA register 508 is subtracted from the new LBA from the CDB received and decoded by CDB receiver and decoder 500. The result of this comparison is returned to configuration and status block 504. The current LBA is obtained after the previous write command has finished writing data to buffer memory 370. The result of this is compared to the value in register 510. The value in register 510 may be a constant or some other value, such as a value from a buffer space counter tracking the amount of space available in buffer memory 370 accessed by DMA engine 362. If the result is within a selected range, the new write is coalesced to the previous write sending a signal to activate the selected context in active context registers 400 to initiate the write. Thus, LBA comparator 506 includes three enable signals that are used to enable and disable LBA comparisons. When enabled, LBA comparator 506 automatically makes comparisons and initiates the write without intervention from microprocessor 380. A result of zero means that the data to be written by the two write commands are contiguous. Otherwise, a skip is required to write the data to the disk.

When start and context information are sent to registers 400, 402, SCSI protocol engine 502 locks the context registers to avoid a switch during an LBA comparison using a signal to DMA engine 362.

Figure 6:
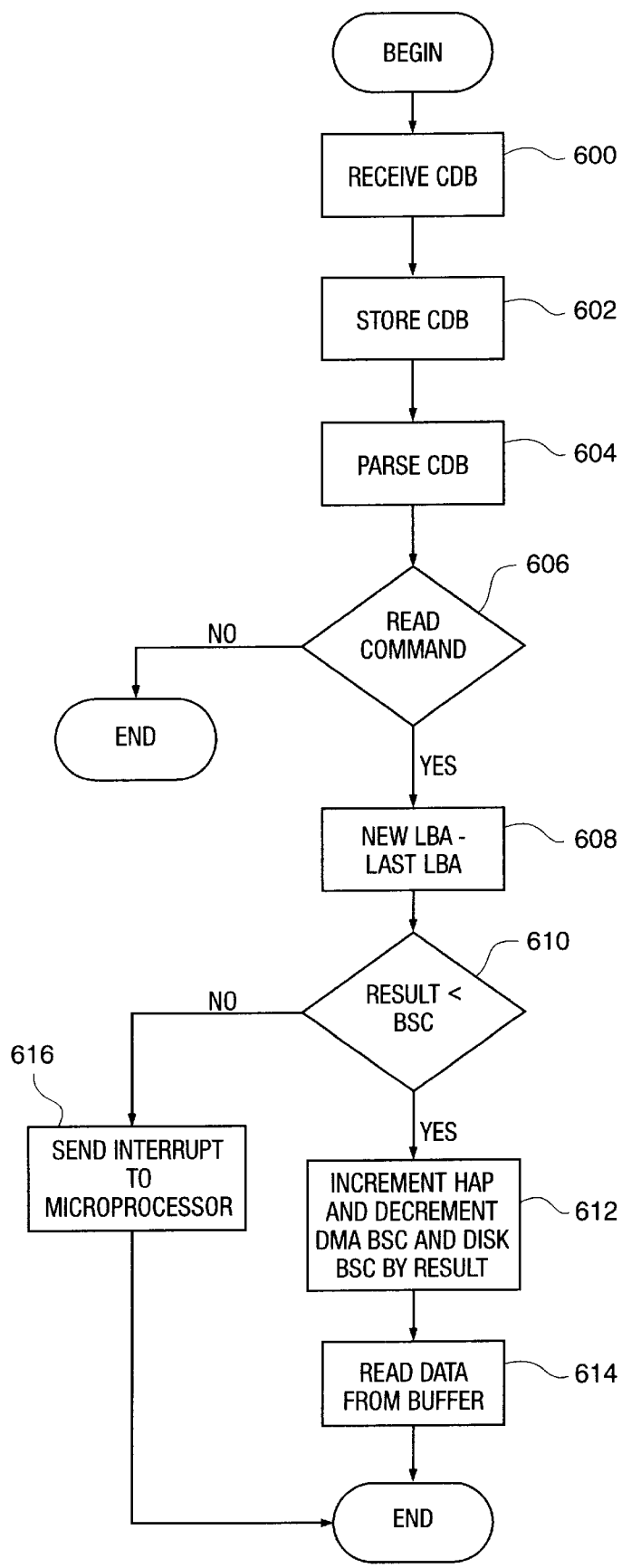
FIG. 6 is a flowchart of a process for writing data to a disk drive in accordance with a preferred embodiment of the present invention.

With reference now to FIG. 6, a flowchart of a process for writing data to a disk drive is illustrated in accordance with a preferred embodiment of the present invention. The process occurs within SCSI interface 361 and begins with the reception of a CDB (step 600). The process then stores the CDB (step 602). Thereafter, the CDB is parsed to determine what type of command was received (step 604). A determination is then made as to whether the command is a write command (step 606). If the command is not a write command, the process ends and returns to step 600. Otherwise, the process subtracts the last LBA from the new LBA in the CDB (step 608).

Thereafter, a determination is made as to whether the difference between the new LBA and the last LBA after the current write being processed commands are within a predetermined range (step 610). The range can be a system constant programmed by the microprocessor or internally derived, such as from the buffer space counter. Basically, the range is selected such that the two writes can be performed in one revolution of the hard disk. If the result is not within a predetermined range, a new buffer segment is selected using an auto write (step 612), and thereafter, a write is executed (step 614).

With reference again to step 610, if the result is within the selected range, the new write command is coalesced to the current buffer segment (step 616) with the execution of the write occurring in step 614 with the process terminating thereafter. Alternatively, the new buffer segment could be selected using a normal write with the microprocessor placing the appropriate information into the context registers and then toggling that information into the active context registers when the DMA engine is ready and then executing the write based on the information in the active context registers.

The present invention provides automatic coalesced writes that optimize the command response time by minimizing extra disk rotations. The auto-write mode primarily optimizes the bus utilization time. By using these two modes along with the first mode of operation, the present invention allows for improved drive performance. Additionally, the present invention provides the advantage of avoiding having the microprocessor calculate the LBA to coalesce to or program it into the controller to enable an auto-write. Additionally, the present invention reduces the need for real time skipped hit coalescing by the microprocessor.

Although the depicted example employs a comparison of LBAs, other factors may be used to determine whether the write requests may be coalesced or written into a new buffer segment. For example, the transfer length of each request may be used to determine whether the two writes requests can be combined as a single write operation.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method for writing data to a storage device comprising:

receiving a first request to write a first set of data to the storage device;

transferring the first set of data to a memory for temporary storage prior to transfer of the first set of data to the storage device;

receiving a second request to write a second set of data to the storage device, wherein the second request includes a logical block address;

determining an ending logical block address after transferring the first set of data to the memory;

comparing the logical block address of the second request to the ending logical block address;

determining whether the first set of data and the second set of data can be written to the storage device as a single write operation based on the comparison of the logical block address of the second request with the ending logical block address;

if it is determined that the first set of data and the second set of data cannot be written to the storage device as a single write operation, writing the second request to memory, and writing the first and second requests to the storage in device in separate write operations without receiving instructions from firmware; and if it is determined that the first set of data and the second set of data can be written to the storage device as a single write operation, writing the second set of data to the memory as part of the first write request.

2. The method of claim 1, wherein the second set of data is automatically transferred to the memory to be written to the storage device as a second write operation in response to a determination that the first set of data and the second set of data cannot be written as a single write operation.

3. The method of claim 1, wherein the sets of data and the requests to write data are received from a small computer system interface (SCSI) bus.

4. The method of claim 1, wherein the storage device is a single hard disk drive.

5. The method of claim 1, wherein the storage device comprises a plurality of hard disk drives.

6. The method of claim 1, further comprising locking context registers to avoid a data switch while the logical block address of the second request is compared to the ending logical block address.

7. The method of claim 1, wherein the comparison step comprises subtracting the ending logical block address from the logical block address of the second request.

8. The method of claim 7, wherein the step of determining whether the second set of data can be written to the storage device as a single write operation includes determining whether the result is less than a selected range, wherein the range is selected such that the second set of data can be written to the storage device as a single write operation with the first set of data.

* * * * *